US006754624B2

(12) United States Patent
Choy et al.

(10) Patent No.: US 6,754,624 B2
(45) Date of Patent: Jun. 22, 2004

(54) CODEBOOK RE-ORDERING TO REDUCE UNDESIRED PACKET GENERATION

(75) Inventors: Eddie-Lun Tik Choy, Carlsbad, CA (US); Arasanipalai K. Ananthapadmanabhan, San Diego, CA (US); Andrew P. DeJaco, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 478 days.

(21) Appl. No.: 09/783,863

(22) Filed: Feb. 13, 2001

(65) Prior Publication Data

US 2002/0111804 A1 Aug. 15, 2002

(51) Int. Cl.[7] .......................... G01L 15/20; G01L 15/08
(52) U.S. Cl. ........................ 704/233; 704/236; 704/238
(58) Field of Search ................................ 704/219, 222, 704/221, 225, 233

(56) References Cited

U.S. PATENT DOCUMENTS

| | | | | | |
|---|---|---|---|---|---|
| 4,907,276 A | * | 3/1990 | Aldersberg | ................. | 704/222 |
| 5,450,449 A | * | 9/1995 | Kroon | ......................... | 704/219 |
| 5,490,230 A | * | 2/1996 | Gerson et al. | .............. | 704/225 |
| 5,784,532 A | | 7/1998 | McDonough et al. | | |
| 5,926,786 A | | 7/1999 | McDonough et al. | | |
| 6,226,607 B1 | * | 5/2001 | Chang et al. | ............... | 704/221 |

FOREIGN PATENT DOCUMENTS

FR 505654 A1 * 3/1991 ............ H03M/7/30

OTHER PUBLICATIONS

Paliwal et al ("Effect Of Ordering The Codebook On The Efficiency Of The Partial Distance Search Algorithm For Vector Quantization", IEEE Transactions on Communications, May 1989).*

Nasrabadi et al ("Next–State Functions For Finite–State Vector Quantization", IEEE Transactions on Image Processing, Dec. 1995).*

Nasrabadi et al ("A Dynamic Finite–State Vector Quantization Scheme", International Conference on Acoustics, Speech, and Signal Processing, Apr. 1990).*

Savoji et al ("Some Experiments On Speech Vector Quantization At Variable Low Bit Rate", Electronics Letters, Mar. 17, 1988.*

QUALCOMM "Appendix A Requirements for CDMA Service Options" Proposed EIA/TIA Wideband Spread Spectrum Standard pp. A1–A67 (1992).

Cawley, et al. "Fast Index Assignment Algorithm for Vector Quantization Over Noisy Transmission Channels" Electronics Letters 32(15): 1343–1344 (1996).

Nasrabadi, et al. "Next–State Functions for Finite–State Vector Quantization" IEEE Transactions on Image Processing (1995).

Paliwal, et al. "Effect of Ordering the Codebook on the Efficiency of the Partial Distance Search Algorithm for Vector Quantization" IEEE Transactions on Communications 37(5): 538–540 (1989).

* cited by examiner

*Primary Examiner*—Richemond Dorvil
*Assistant Examiner*—Daniel A Nolan
(74) *Attorney, Agent, or Firm*—Philip Wadsworth; Charles D. Brown; Kyong H. Macek

(57) ABSTRACT

A method and apparatus for enhancing coding efficiency by reducing illegal or other undesirable packet generation while encoding a signal. The probability of generating illegal or other undesirable packets while encoding a signal is reduced by first analyzing a history of the frequency of codebook values selected while quantizing speech parameters. Codebook entries are then reordered so that the index/indices that create illegal or other undesirable packets contain the least frequently used entry/entries. Reordering multiple codebooks for various parameters further reduces the probability that an illegal or other undesirable packet will be created during signal encoding. The method and apparatus may be applied to reduce the probability of generating illegal null traffic channel data packets while encoding eighth rate speech.

26 Claims, 5 Drawing Sheets

CODEBOOK RE-ORDERING TO REDUCE UNDESIRED PACKET GENERATION

BACKGROUND

1. Field

The disclosed embodiments relate generally to wireless communications, and more specifically to the field of signal processing.

2. Background

Transmission of voice by digital techniques has become widespread, particularly in long distance and digital radio telephone applications. This, in turn, has created interest in determining the least amount of information that can be sent over a channel while maintaining the perceived quality of the reconstructed speech. If speech is transmitted by simply sampling and digitizing, a data rate on the order of sixty-four kilobits per second (kbps) is required to achieve a speech quality of conventional analog telephone. However, through the use of speech analysis, followed by the appropriate coding, transmission, and re-synthesis at the receiver, a significant reduction in the data rate can be achieved.

Devices that employ techniques to compress speech by extracting parameters that relate to a model of human speech generation are called speech coders. A speech coder divides the incoming speech signal into blocks of time, or analysis frames. Hereinafter, the terms "frame" and "packet" are inter-changeable. Speech coders typically comprise an encoder and a decoder, or a codec. The encoder analyzes the incoming speech frame to extract certain relevant gain and spectral parameters, and then quantizes the parameters into binary representation, i.e., to a set of bits or a binary data packet. The data packets are transmitted over the communication channel to a receiver and a decoder. The decoder processes the data packets, de-quantizes them to produce the parameters, and then re-synthesizes the frames using the de-quantized parameters.

The function of the speech coder is to compress the digitized speech signal into a low-bit-rate signal by removing all of the natural redundancies inherent in speech. The digital compression is achieved by representing the input speech frame with a set of parameters and employing quantization to represent the parameters with a set of bits. If the input speech frame has a number of bits $N_i$ and the data packet produced by the speech coder has a number of bits $N_o$, the compression factor achieved by the speech coder is $C_r=N_i/N_o$. The challenge is to retain high voice quality of the decoded speech while achieving the target compression factor. The performance of a speech coder depends on (1) how well the speech model, or the combination of the analysis and synthesis process described above, performs, and (2) how well the parameter quantization process is performed at the target bit rate of $N_o$ bits per frame. The goal of the speech model is thus to capture the essence of the speech signal, or the target voice quality, with a small set of parameters for each frame.

Speech coders may be implemented as time-domain coders, which attempt to capture the time-domain speech waveform by employing high time-resolution processing to encode small segments of speech (typically 5 millisecond (ms) sub-frames) at a time. For each sub-frame, a high-precision representative from a codebook space is found by means of various search algorithms known in the art. Alternatively, speech coders may be implemented as frequency-domain coders, which attempt to capture the short-term speech spectrum of the input speech frame with a set of parameters (analysis) and employ a corresponding synthesis process to recreate the speech waveform from the spectral parameters. The parameter quantizer preserves the parameters by representing them with stored representations of code vectors in accordance with known quantization techniques described in A. Gersho & R. M. Gray, *Vector Quantization and Signal Compression* (1992). Different types of speech within a given transmission system may be coded using different implementations of speech coders, and different transmission systems may implement coding of given speech types differently. Typically, voiced and unvoiced speech segments are captured at high bit rates, and background noise and silence segments are represented with modes working at a significantly lower rate. Speech coders used in CDMA digital cellular systems employ variable bit-rate (VBR) technology, in which one of four data rates is selected every 20 ms, depending on the speech activity and the local characteristics of the speech signal. The data rates include full rate, half rate, quarter rate, and eighth rate. Typically, transient speech segments are coded at full rate. Voiced speech segments are coded at half rate, while silence and background noise (inactive speech) are coded at eighth rate, in which conventionally, only the spectral parameters and the energy contour of the signal are quantized at the lower bit rate.

For coding at lower bit rates, various methods of spectral, or frequency-domain, coding of speech have been developed, in which the speech signal is analyzed as a time-varying evolution of spectra. See, e.g., R. J. McAulay & T. F. Quatieri, *Sinusoidal Coding*, in *Speech Coding and Synthesis* ch. 4 (W. B. Kleijn & K. K. Paliwal eds., 1995). In spectral coders, the objective is to model, or predict, the short-term speech spectrum of each input frame of speech with a set of spectral parameters, rather than to precisely mimic the time-varying speech waveform. The spectral parameters are then encoded and an output frame of speech is created with the decoded parameters. The resulting synthesized speech does not match the original input speech waveform, but offers similar perceived quality. Examples of frequency-domain coders that are well known in the art include multiband excitation coders (MBEs), sinusoidal transform coders (STCs), and harmonic coders (HCs). Such frequency-domain coders offer a high-quality parametric model having a compact set of parameters that can be accurately quantized with the low number of bits available at low bit rates.

The process of encoding speech involves representing the speech signal using a set of parameters such as pitch, signal power gain, spectral envelope, amplitude, and phase spectra, which are then coded for transmission. The parameters are coded for transmission by quantizing each parameter and converting the quantized parameter values into bit-streams. A parameter is quantized by looking for the closest approximating value of the parameter from a predetermined finite set of codebook values. Codebook entries may be either scalar or vector values. The indices of the codebook entries most closely approximating the parameter values are packetized for transmission. At a receiver, a decoder employs a simple lookup technique using the transmitted indices to recover the speech parameters from an identical codebook in order to synthesize the original speech signal.

The speech encoding process may produce a binary packet for transmission containing any possible permutation of codebook indices, including a packet containing all ones. In existing CDMA systems, packets containing all ones are reserved for null traffic channel data. Null traffic channel data is generated at the physical layer when no signaling message is being transmitted. Null traffic channel data serves to maintain the connectivity between a user terminal and a base station. A user terminal may comprise a cellular telephone for mobile subscribers, a cordless telephone, a paging device, a wireless local loop device, a personal digital assistant (PDA), an Internet telephony device, a component of a satellite communication systems, or any other component device of a communications system. As defined in EIA/TIA/IS-95, null traffic channel data is equivalent to an eighth-rate packet with all bits set to one. Packets containing null traffic channel data are typically declared as erasures by speech decoders. Speech encoders must not allow a permutation of codebook indices representing quantized speech parameters to generate an illegal packet containing all ones, which is reserved for null traffic channel data. If an eighth-rate packet happens to be all ones after quantization, the encoder generally modifies the packet by re-computing a new packet. The re-computation procedure is repeated until a non all-ones packet is generated. Modification, or re-computation of a packet usually results in a sub-optimally encoded packet. Any sub-optimally encoded packet reduces the coding efficiency of the system. Thus, there is a need for avoiding re-computation by reducing the probability that illegal packets containing all ones, or any other undesirable permutation, will be generated during the process of encoding speech.

SUMMARY

Embodiments disclosed herein address the above-stated needs by reducing the likelihood of producing an illegal null traffic channel data packet containing all ones, or any other undesirable permutation, while encoding a signal. Accordingly, in one aspect, a method for determining bit stream representation of signal parameters quantized for encoded transmission includes analyzing a history of the frequency of codebook values selected for quantizing the signal parameters, and reordering the codebook entries to manipulate the contents of the bit stream. In another aspect, a speech coder for encoding speech includes a frequency history generator for creating a statistical history of the frequency at which each codebook entry in a codebook for a given parameter is selected during parameter quantization while encoding a speech signal, and a codebook reorderer for reordering the codebook to manipulate the probability of producing a predetermined packet format while encoding a speech signal.

DETAILED DESCRIPTION

The disclosed embodiments provide a method and apparatus for enhancing coding efficiency by reducing illegal or other undesirable packet generation while encoding a signal. The likelihood of generating illegal or other undesirable packets while encoding a signal is reduced by first analyzing a history of the frequency of codebook values selected by quantizing signal parameters. The codebook entries are then reordered so that the index/indices that create illegal or other undesirable packets contain the least frequently used entry/entries. Reordering multiple codebooks for various parameters further reduces the likelihood, or probability, that an illegal or other undesirable packet can be created during signal encoding.

Figure 1:
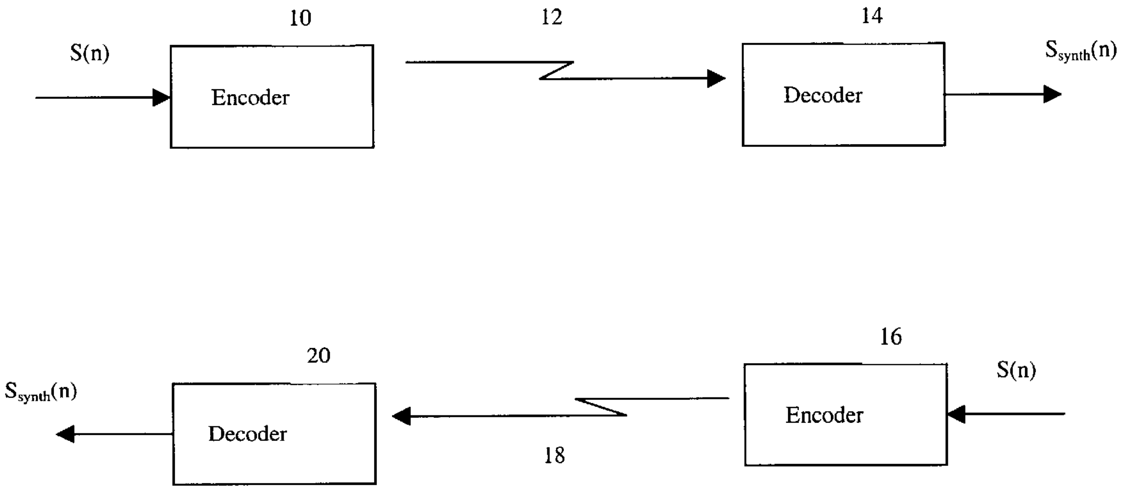
FIG. 1 is a block diagram of a communication channel terminated at each end by speech coders.

In FIG. 1 a first encoder 10 receives digitized speech samples s(n) and encodes the samples s(n) for transmission on a transmission medium 12, or communication channel 12, to a first decoder 14. The decoder 14 decodes the encoded speech samples and synthesizes an output speech signal $s_{SYNTH}(n)$. For transmission in the opposite direction, a second encoder 16 encodes digitized speech samples s(n), which are transmitted on a communication channel 18. A second decoder 20 receives and decodes the encoded speech samples, generating a synthesized output speech signal $s_{SYNTH}(n)$.

The speech samples, s(n), represent speech signals that have been digitized and quantized in accordance with any of various methods known in the art including, e.g., pulse code modulation (PCM), companded $\mu$-law, or A-law. As known in the art, the speech samples, s(n), are organized into frames of input data wherein each frame comprises a predetermined number of digitized speech samples s(n). In an exemplary embodiment, a sampling rate of 8 kHz is employed, with each 20 ms frame comprising 160 samples. In the embodiments described below, the rate of data transmission may be varied on a frame-to-frame basis from full rate to half rate to quarter rate to eighth rate. Alternatively, other data rates may be used. As used herein, the terms "full rate" or "high rate" generally refer to data rates that are greater than or equal to 8 kbps, and the terms "half rate" or "low rate" generally refer to data rates that are less than or equal to 4 kbps. Varying the data transmission rate is beneficial because lower bit rates may be selectively employed for frames containing relatively less speech information. As understood by those skilled in the art, other sampling rates, frame sizes, and data transmission rates may be used.

The first encoder 10 and the second decoder 20 together comprise a first speech coder, or speech codec. Similarly, the second encoder 16 and the first decoder 14 together comprise a second speech coder. It is understood by those of skill in the art that speech coders may be implemented with a digital signal processor (DSP), an application-specific integrated circuit (ASIC), discrete gate logic, firmware, or any conventional programmable software module and a microprocessor. The software module could reside in RAM memory, flash memory, registers, or any other form of writable storage medium known in the art. Alternatively, any conventional processor, controller, or state machine could be substituted for the microprocessor. Exemplary ASICs designed specifically for speech coding are described in U.S. Pat. No. 5,926,786, entitled APPLICATION SPECIFIC INTEGRATED CIRCUIT (ASIC) FOR PERFORMING RAPID SPEECH COMPRESSION IN A MOBILE TELEPHONE SYSTEM, assigned to the assignee of the presently disclosed embodiments and fully incorporated herein by reference, and U.S. Pat. No. 5,784,532, also entitled APPLICATION SPECIFIC INTEGRATED CIRCUIT (ASIC) FOR PERFORMING RAPID SPEECH COMPRESSION IN A MOBILE TELEPHONE SYSTEM, assigned to the assignee of the presently disclosed embodiments, and fully incorporated herein by reference.

Figure 2:
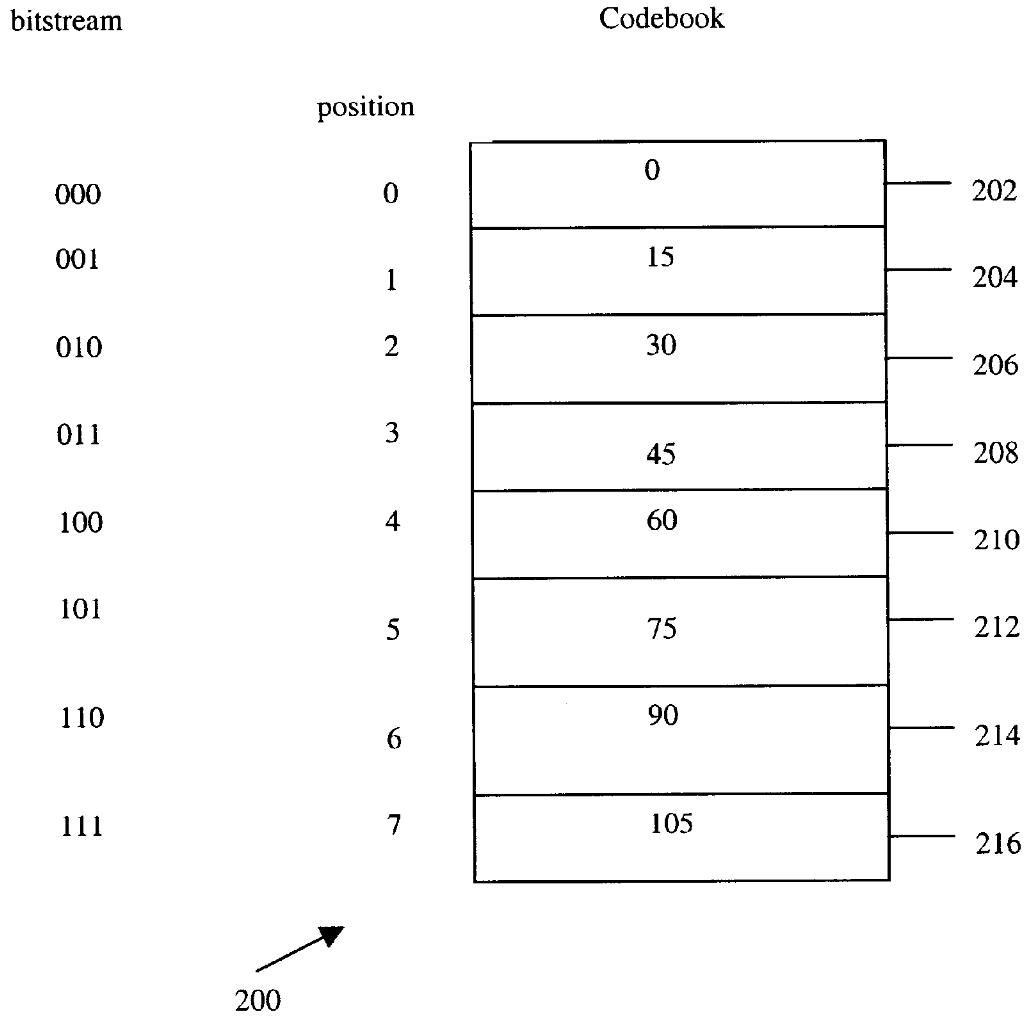
FIG. 2 illustrates a simplified gain codebook that that can be used by the encoders and decoders illustrated in FIG. 1.

FIG. 2 illustrates an exemplary embodiment of a simplified gain codebook 200 that can be used by the encoders and decoders illustrated in FIG. 1 (10,20,14,16). The exemplary codebook serves to illustrate how an illegal null traffic channel data packet could be created while quantizing speech gain parameters. The exemplary codebook 200 contains eight exemplary gain entries 202–216.

Entry position 0 202 of the exemplary codebook 200 contains a gain value of 0. The bit stream 000 is packetized for transmission when the value 0 most closely approximates the actual gain parameter being quantized.

Entry position 1 204 of the exemplary codebook 200 contains a gain value of 15. The bit stream 001 is packetized for transmission when the value 15 most closely approximates the actual gain parameter being quantized.

Entry position 2 206 of the exemplary codebook 200 contains a gain value of 30. The bit stream 010 is packetized for transmission when the value 30 most closely approximates the actual gain parameter being quantized.

Entry position 3 208 of the exemplary codebook 200 contains a gain value of 45. The bit stream 011 is packetized for transmission when the value 45 most closely approximates the actual gain parameter being quantized.

Entry position 4 210 of the exemplary codebook 200 contains a gain value of 60. The bit stream 100 is packetized for transmission when the value 60 most closely approximates the actual gain parameter being quantized.

Entry position 5 212 of the exemplary codebook 200 contains a gain value of 75. The bit stream 101 is packetized for transmission when the value 75 most closely approximates the actual gain parameter being quantized.

Entry position 6 214 of the exemplary codebook 200 contains a gain value of 90. The bit stream 110 is packetized for transmission when the value 90 most closely approximates the actual gain parameter being quantized.

Entry position 7 216 of the exemplary codebook 200 contains a gain value of 105. The bit stream 111 is packetized for transmission when the value 105 most closely approximates the actual gain parameter being quantized.

In an exemplary embodiment, an illegal eighth rate null traffic channel data packet contains sixteen bits, all equal to one. In the exemplary embodiment, a transmission packet contains one bit equal to one when the encoder begins quantizing 5 sample gain parameter values equal to 103, 104, 98, 99, and 100. The codebook entry position 7 containing the value 105 216 most closely approximates the parameter values equal to 103, 104, 98, 99, and 100, causing a bit stream of three ones to be packetized for each of the 5 parameters. After quantization of the 5 parameters, the exemplary eighth rate packet contains 16 ones. The exemplary eighth rate packet created by the encoding of the 5 sample gain parameters constitutes an illegal null traffic channel data packet, which would cause an erasure at the receiver. To avoid erasures at the receiver, the packet must be modified or recomputed. If the packet is modified, it will be sub-optimally encoded, reducing the coding efficiency of the system. Reduced coding efficiency is the result of illegal packet creation, or sub-optimal encoding, during speech encoding by conventional systems.

Figure 3:
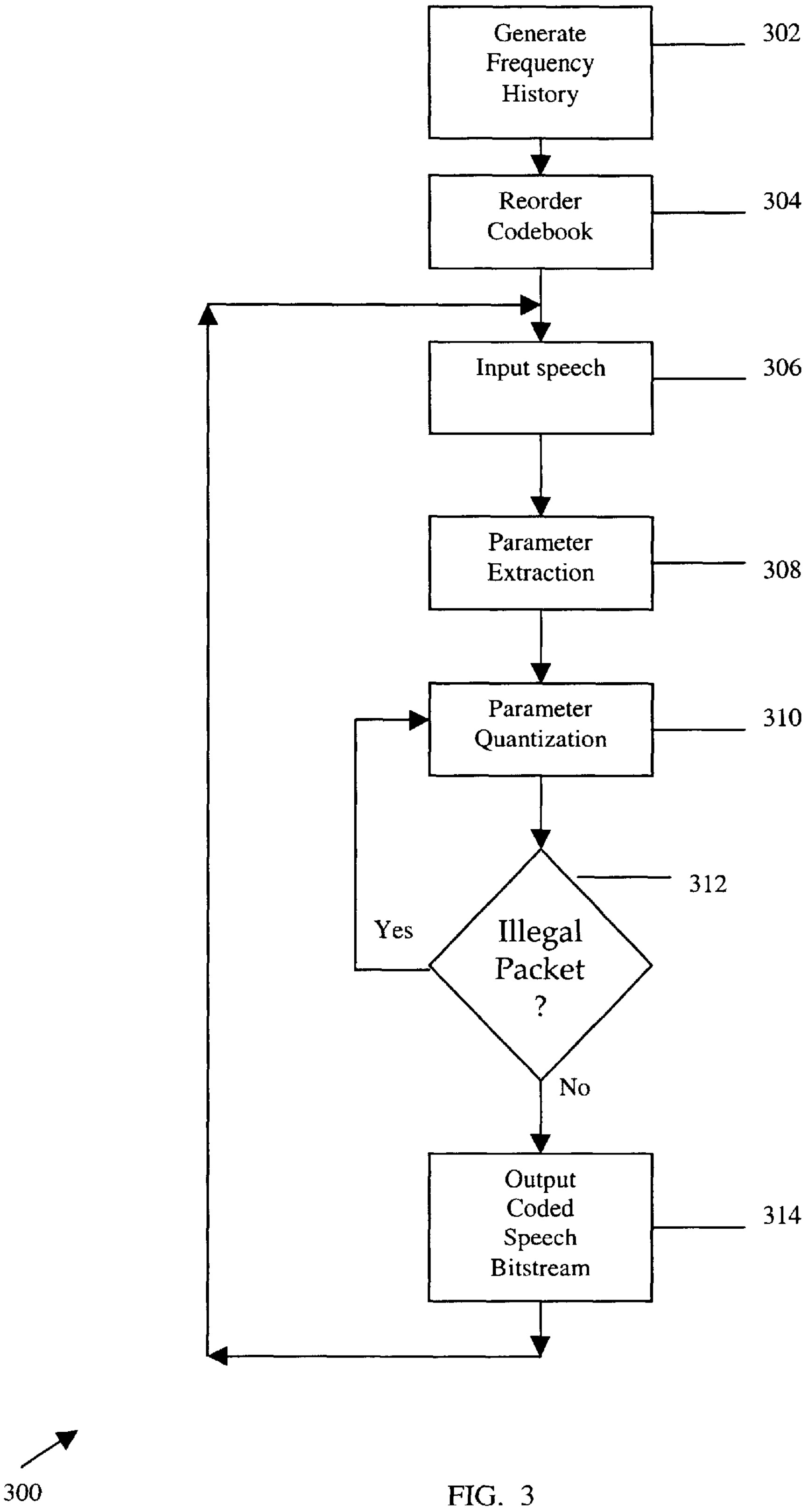
FIG. 3 is a flowchart illustrating encoding steps that reduce the likelihood of generating illegal, or undesirable, packets while encoding a signal.

FIG. 3 is a flowchart 300 illustrating steps of reducing the likelihood of illegal or other undesirable packet creation during speech encoding in accordance with an exemplary embodiment. A statistical frequency history analyzing how frequently each codebook entry is selected during the parameter quantization process based on a large representative speech and noise sample, or an input speech signal, is created. In one embodiment, a large representative speech and noise data base is used to provide the speech and noise sample. The least used codeword entry according to the statistical frequency history is positioned in the codebook entry location whose bit stream generation can create an illegal or other undesirable packet. Positioning the least used codebook entry in the location associated with the undesired bit pattern reduces the probability that the undesired bit pattern will be packetized. The historical frequency analysis and codebook reordering process can be repeated for the codebooks of all the quantized parameters in a codec. Each additional reordered codebook further reduces the likelihood of generating an illegal or other undesirable packet. The statistical frequency analysis and the codebook reordering are generally performed offline. However, one may also implement the statistical frequency analysis and the codebook reordering in real-time.

Although the illegal packet of the exemplary embodiments is described as an eighth rate, all ones null traffic channel data packet, it is obvious to those skilled in the art that the techniques of the disclosed embodiments may also be applied to reduce the likelihood of any undesired packet, varying in format, size and/or transmission rate. While the disclosed embodiments are described in terms of a CDMA communications system, it should also be understood that the disclosed embodiments are applicable to other types of communications systems and modulation techniques, such as Personal Communications Systems (PCS), wireless local loop (WLL), private branch exchange (PBX), or other known systems. Furthermore, systems utilizing other well known transmission modulation schemes such as TDMA and FDMA as well as other spread spectrum systems may employ the disclosed embodiments. One skilled in the art would understand that the disclosed embodiments are not restricted to the exemplary speech coding application. The disclosed embodiments can also be applied to any general signal source coding technique such as, e.g., video coding, image coding, and audio coding.

Those of skill would further appreciate that the principle of the disclosed embodiments may also be applied to enhance the likelihood of creating a desired packet by reordering the codebook such that the most frequently used entry is positioned in the codebook location associated with the desired bit stream. A method for increasing desired packet generation while encoding a signal includes creating a statistical history of the frequency at which each codebook entry for a given parameter is selected during parameter quantization while encoding the signal and reordering the codebook by positioning the most frequently selected codebook entry in the codebook location associated with a desired packet format.

In step 302, a statistical frequency history sample is created. The frequency history is created by analyzing a large representative speech and noise sample to determine how frequently each codebook entry for a given parameter is selected during the parameter quantization process. In one embodiment, the statistical frequency history is created using a data base containing a large representative speech and noise sample. Control flow proceeds to step 304.

In step 304, the codebook entries for a given parameter are manipulated to avoid or encourage a pre-determined packet format. To manipulate a codebook to avoid an undesired packet format, the least used codeword entry according to the statistical frequency history is positioned in the codebook entry location whose bit stream generation can create the undesired packet. Positioning the least used codebook entry in the location associated with the undesired bit pattern reduces the probability that the undesired bit pattern will be packetized. To manipulate a codebook to encourage a desired packet format, the most used codeword entry according to the statistical frequency history is positioned in the codebook entry location whose bit stream generation can create the desired packet. Positioning the most used codebook entry in the location associated with the desired bit pattern increases the probability that the desired bit pattern will be packetized. The step of codebook reordering is further detailed in FIG. 4.

In one embodiment, steps 302 and 304 may be performed offline during the design stage of the codebook to permanently reorder the codebook for a desired packet outcome. In another embodiment, steps 302 and 304 may be dynamically performed in real time to reorder the codebook for a desired packet outcome at a particular time. After step 304, control flow proceeds to step 306.

In step 306, an input speech signal is provided to the encoder for packetization and transmission. Control flow proceeds to step 308.

In step 308, the input speech sample is analyzed to extract the relevant parameters. Control flow proceeds to step 310.

In step 310, the extracted parameters are quantized and packetized. The probability that the generated packet contains an undesirable format is greatly reduced by the reordering of the codebook in steps 302 and 304. Control flow proceeds to step 312.

In step 312, the packet is checked to ensure that in spite of the codebook reordering, an undesired packet has not been created. If the undesired packet has not been created, control flow proceeds to step 314, where the packet is output for bit stream transmission. If in step 312, even though the probability is greatly reduced, an undesired packet has been generated, control flow returns to step 310 where the process of quantization is repeated with conventional sub-optimal codebook entries. Steps 310 and 312 may be repeated to regenerate the packet until the packet no longer contains the undesirable format.

Steps 306–314 are repeated for every packet or frame of data input to the encoder for transmission. One skilled in the art will understand that ordering of steps illustrated in FIG. 3 is not limiting. The method is readily amended by omission or re-ordering of the steps illustrated without departing from the scope of the disclosed embodiments.

Figure 4:
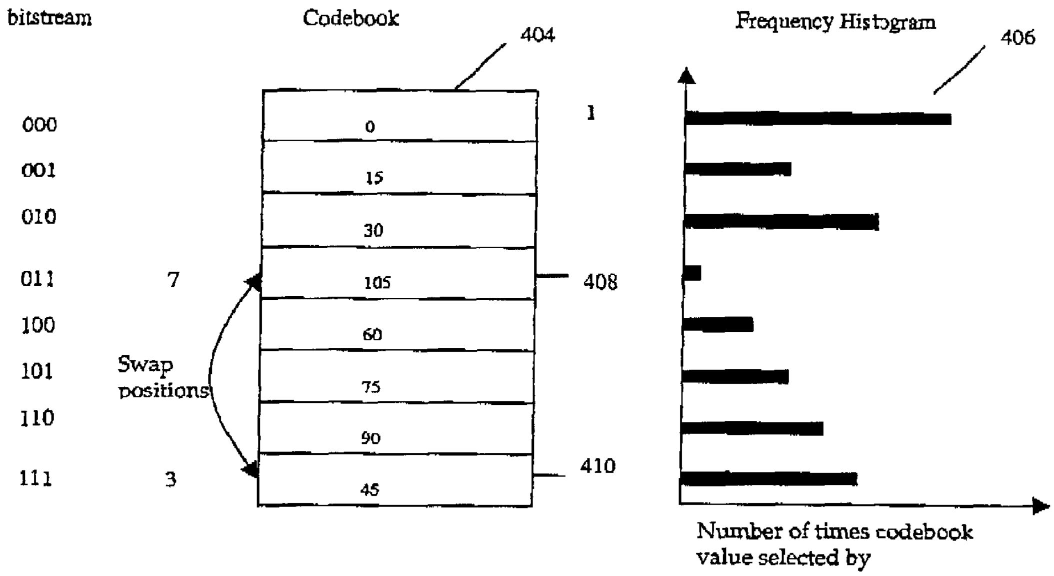
FIG. 4 illustrates the codebook reordering step described in FIG. 3.

FIG. 4 further details the codebook reordering step 304 of FIG. 3. In an exemplary embodiment, a frequency histogram 406 is generated from the statistical frequency history sample created in step 302 of FIG. 3 using the exemplary codebook 200 of FIG. 2. The histogram 406 shows that the value of 45, in entry position 3 of the exemplary codebook 200 of FIG. 2, is the entry least frequently selected during the parameter quantization process. The least frequently selected value of 45 410 is swapped into codebook position 7, which generates the undesirable bit stream of all ones for the exemplary embodiment in which null channel traffic data packet generation is undesirable. The value 105 408, formerly located in position 7, replaces the value of 45 410 in position 3. The likelihood that the undesirable bit stream of all ones will be generated has now been reduced because the reordered codebook 404 has reduced the likelihood that the quantized value of 45 410 will be selected during quantization.

Figure 5:
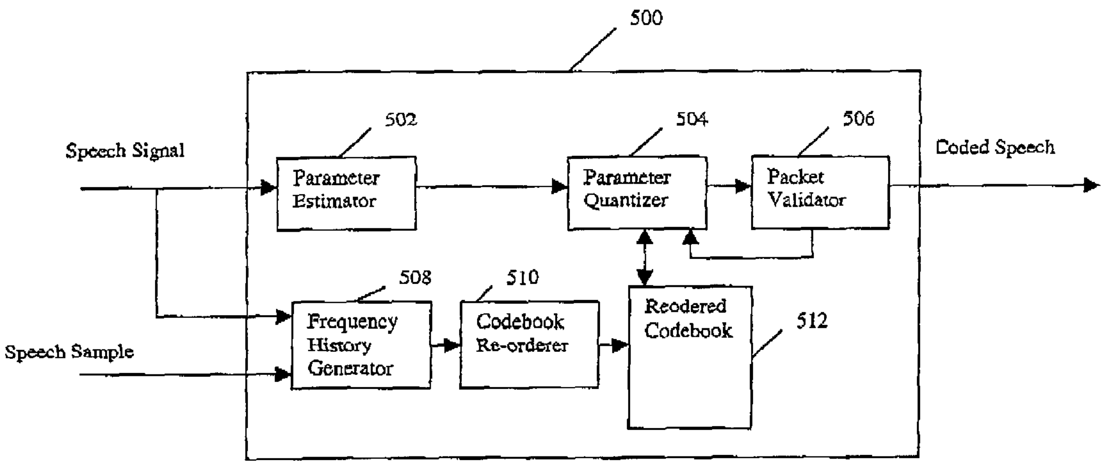
FIG. 5 is a block diagram of an encoder that can be used to reduce the likelihood of generating illegal or other undesirable packets while encoding a signal.

FIG. 5 illustrates an exemplary embodiment of an encoder apparatus 500 for enhancing coding efficiency by reducing undesired packet generation while encoding a signal. Frequency History Generator 508 creates a selection frequency history by analyzing either a large representative speech and noise sample or an input speech signal. In one embodiment, the statistical frequency history is created using a data base containing a large representative speech and noise sample. The selection frequency of each codebook entry for a given parameter during the parameter quantization process is determined by the Frequency History generator 508 and input to Codebook Re-orderer 510.

Codebook Reorderer 510 reorders codebook entries to avoid or encourage a pre-determined packet format, producing Reordered Codebook 512. Codebook reordering is generally performed offline to save computational power; however, codebook reordering can optionally be performed in real-time.

A speech signal is input to parameter estimator 502, which extracts the relevant parameters for quantization. The extracted parameters are input to Parameter Quantizer 504, which uses the Re-ordered Codebook 512 to generate a transmission packet. The transmission packet is validated by Packet Validator 506, which outputs a coded speech bit stream. In one embodiment, a base station comprises the encoder apparatus 500 for enhancing coding efficiency by reducing undesired packet generation while encoding a signal. In another embodiment, a user terminal comprises encoder apparatus 500 for enhancing coding efficiency by reducing undesired packet generation while encoding a signal. In another embodiment, a base station, or a user terminal, comprises a computer-readable medium having instructions stored thereon to cause computers in a communication system to create a statistical history of the frequency at which each codebook entry for a given parameter is selected during parameter quantization while encoding the signal, and to reorder the codebook to decrease undesired packet generation, or increase desired packet generation.

Thus, a novel and improved method and apparatus for enhancing coding efficiency by reducing undesired packet generation while encoding a signal have been described. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for reducing undesired packet generation while encoding a signal comprising:

creating a statistical history of the frequency at which each codebook entry in a codebook for a given parameter is selected during parameter quantization while encoding the signal; and reordering the codebook by positioning the least frequently selected codebook entry in the codebook location associated with an undesired packet format.

2. The method of claim 1 wherein the creating a statistical history of the frequency at which each codebook entry in a codebook for a given parameter is selected during parameter quantization comprises analyzing a representative signal and noise sample.

3. The method of claim 1 wherein the creating a statistical history of the frequency at which each codebook entry in a codebook for a given parameter is selected during parameter quantization comprises analyzing an input signal.

4. The method of claim 1 wherein a plurality of codebooks associated with a plurality of parameters representing one signal are reordered.

5. The method of claim 1 wherein the undesired packet is a null traffic channel data packet.

6. The method of claim 5 wherein the null traffic channel data packet contains all binary ones.

7. The method of claim 5 wherein the null traffic channel data packet is encoded at eighth rate.

8. A speech coder for encoding speech comprising:

a frequency history generator for creating a statistical history of the frequency at which each codebook entry in a codebook for a given parameter is selected during parameter quantization while encoding a speech signal; and a codebook recorder for reordering the codebook to manipulate the probability of producing a predetermined packet format while encoding a speech signal, wherein the codebook reorderer for reordering the codebook to manipulate the probability of producing a predetermined packet format while encoding a speech signal reduces the probability of producing an undesired packet.

9. The speech coder of claim 8 wherein the undesired packet is a null traffic channel data packet.

10. The speech coder of claim 9 wherein the null traffic channel data packet contains all binary ones.

11. The speech coder of claim 9 wherein the null traffic channel data packet is encoded at eighth rate.

12. A base station capable of encoding a signal comprising:

a frequency history generator for creating a statistical history of the frequency at which each codebook entry in a codebook for a given parameter is selected during parameter quantization of the signal; and a codebook reorderer for reordering the codebook to manipulate the probability of producing a predetermined packet format while encoding the signal, wherein the codebook reorderer for reordering the codebook to manipulate the probability of producing a predetermined packet format while encoding a signal reduces the probability of producing an undesired packet.

13. The base station of claim 12 wherein the undesired packet is a null traffic channel data packet.

14. The base station of claim 13 wherein the null traffic channel data packet contains all binary ones.

15. The base station of claim 13 wherein the null traffic channel data packet is encoded at eighth rate.

16. A user terminal capable of encoding a signal comprising:

a frequency history generator for creating a statistical history of the frequency at which each codebook entry in a codebook for a given parameter is selected during parameter quantization of the signal; and a codebook reorderer for reordering the codebook to manipulate the probability of producing a predetermined packet format while encoding the signal, wherein the codebook reorderer for reordering the codebook to manipulate the probability of producing a predetermined packet format while encoding a signal reduces the probability of producing an undesired packet.

17. The user terminal of claim 16 wherein the undesired packet is a null traffic channel data packet.

18. The user terminal of claim 17 wherein the null traffic channel data packet contains all binary ones.

19. The user terminal of claim 17 wherein the null traffic channel data packet is encoded at eighth rate.

20. A computer-readable medium having instructions stored thereon to cause computers in a communication system to perform a method for reducing undesired packet generation while encoding a signal comprising:

creating a statistical history of the frequency at which each codebook entry in a codebook for a given parameter is selected during parameter quantization while encoding the signal; and reordering the codebook by positioning the least frequently selected codebook entry in the codebook location associated with an undesired packet format.

21. The article of manufacture of claim 20 wherein the creating a statistical history of the frequency at which each codebook entry in a codebook for a given parameter is selected during parameter quantization comprises analyzing a representative signal and noise sample.

22. The article of manufacture of claim 20 wherein the creating a statistical history of the frequency at which each codebook entry in a codebook for a given parameter is selected during parameter quantization comprises analyzing an input signal.

23. The article of manufacture of claim 20 wherein a plurality of codebooks associated with a plurality of parameters representing one signal are reordered.

24. The article of manufacture of claim 20 wherein the undesired packet is a null traffic channel data packet.

25. The article of manufacture of claim 24 wherein the null traffic channel data packet contains all binary ones.

26. The article of manufacture of claim 24 wherein the null traffic channel data packet is encoded at eighth rate.

* * * * *

UNITED STATES PATENT AND TRADEMARK OFFICE

CERTIFICATE OF CORRECTION

PATENT NO. : 6,754,624 B2

DATED : June 22, 2004

INVENTOR(S) : Eddie-Lun Tik Choy et al.

It is certified that error appears in the above-identified patent and that said Letters Patent is hereby corrected as shown below:

<u>Column 9,</u>
Line 53, please change “recorder” to -- reorderer --.

Signed and Sealed this

Twenty-second Day of November, 2005

JON W. DUDAS

*Director of the United States Patent and Trademark Office*